(12) United States Patent
Durston et al.

(10) Patent No.: US 9,234,907 B2
(45) Date of Patent: Jan. 12, 2016

(54) ANGULAR RATE SENSOR WITH IMPROVED AGING PROPERTIES

(75) Inventors: Michael Durston, Plymouth (GB); Kevin Townsend, Plymouth (GB); Christopher Paul Fell, Plymouth (GB)

(73) Assignee: SILICON SENSING SYSTEMS LIMITED (GB)

( * ) Notice: Subject to any disclaimer, the term of this patent is extended or adjusted under 35 U.S.C. 154(b) by 362 days.

(21) Appl. No.: 13/698,342

(22) PCT Filed: May 19, 2011

(86) PCT No.: PCT/GB2011/000758
§ 371 (c)(1),
(2), (4) Date: Jan. 29, 2013

(87) PCT Pub. No.: WO2011/144899
PCT Pub. Date: Nov. 24, 2011

(65) Prior Publication Data
US 2013/0233074 A1    Sep. 12, 2013

(30) Foreign Application Priority Data
May 21, 2010    (GB) .................................. 1008526.4

(51) Int. Cl.
*G01P 3/44* (2006.01)
*G01C 19/567* (2012.01)
*G01C 19/5628* (2012.01)
*G01C 19/5733* (2012.01)

(52) U.S. Cl.
CPC ............... *G01P 3/44* (2013.01); *G01C 19/567* (2013.01)

(58) Field of Classification Search
CPC ............................ G01C 19/567; G01P 3/44

USPC ............. 73/504.02–504.18, 514.01–514.019
See application file for complete search history.

(56) References Cited

U.S. PATENT DOCUMENTS

| 5,496,436 A | 3/1996 | Bernstein et al. |
| 5,945,600 A * | 8/1999 | Touge et al. ............... 73/504.14 |
| 2005/0256659 A1 | 11/2005 | Malvern et al. |

FOREIGN PATENT DOCUMENTS

| CN | 101191749 A | 6/2008 |
| EP | 0 592 171 | 4/1994 |

(Continued)

OTHER PUBLICATIONS

Hong, Sung K., Compensation of nonlinear thermal bias drift of Resonant Rate Sensor using fuzzy logic; Sensors and Actuators; vol. 78, 1999, pp. 143-148.

(Continued)

*Primary Examiner* — Eric S McCall
*Assistant Examiner* — Anthony W Megna Fuentes
(74) *Attorney, Agent, or Firm* — Cantor Colburn LLP

(57) ABSTRACT

An angular velocity sensor is described with improved ageing and hysteresis properties. The sensor may be of a ring type driven by a driver circuit, the sensor further comprising primary and secondary portions having corresponding signal pickoffs. The gain of the primary pickoff signal and the capacitance of the primary portions of the sensor are controlled relative to the gain of the secondary pickoff and the capacitance of the secondary portions of the sensor. Control electronics is provided that enables matching of the relative signals from the respective channels. In this way, temperature hysteresis and ageing effects of materials used in forming the sensor are overcome.

7 Claims, 9 Drawing Sheets

Optimised mismatched transducers gains (Ks = 150*Kp)

(56) References Cited

FOREIGN PATENT DOCUMENTS

| EP | 0592171 A1 | 4/1994 |
| GB | 2266588 A | 11/1993 |
| JP | H06281661 A | 10/1994 |
| JP | 20033121156 A | 4/2003 |
| JP | 2009180506 A | 8/2009 |
| WO | 2009119204 A1 | 10/2009 |

OTHER PUBLICATIONS

International Search Report mailed Aug. 29, 2011.
Office Action for Japanese Patent Application No. 2013-510671 dated Aug. 26, 2014; 2 pages.
Search Report for Patent Application No. GB1008526.4 dated Sep. 16, 2010, Received Sep. 21, 2010; pp. 3.
Office Action for Application No. 201180025327.9 dated Aug. 25, 2015; 12 pages.

* cited by examiner

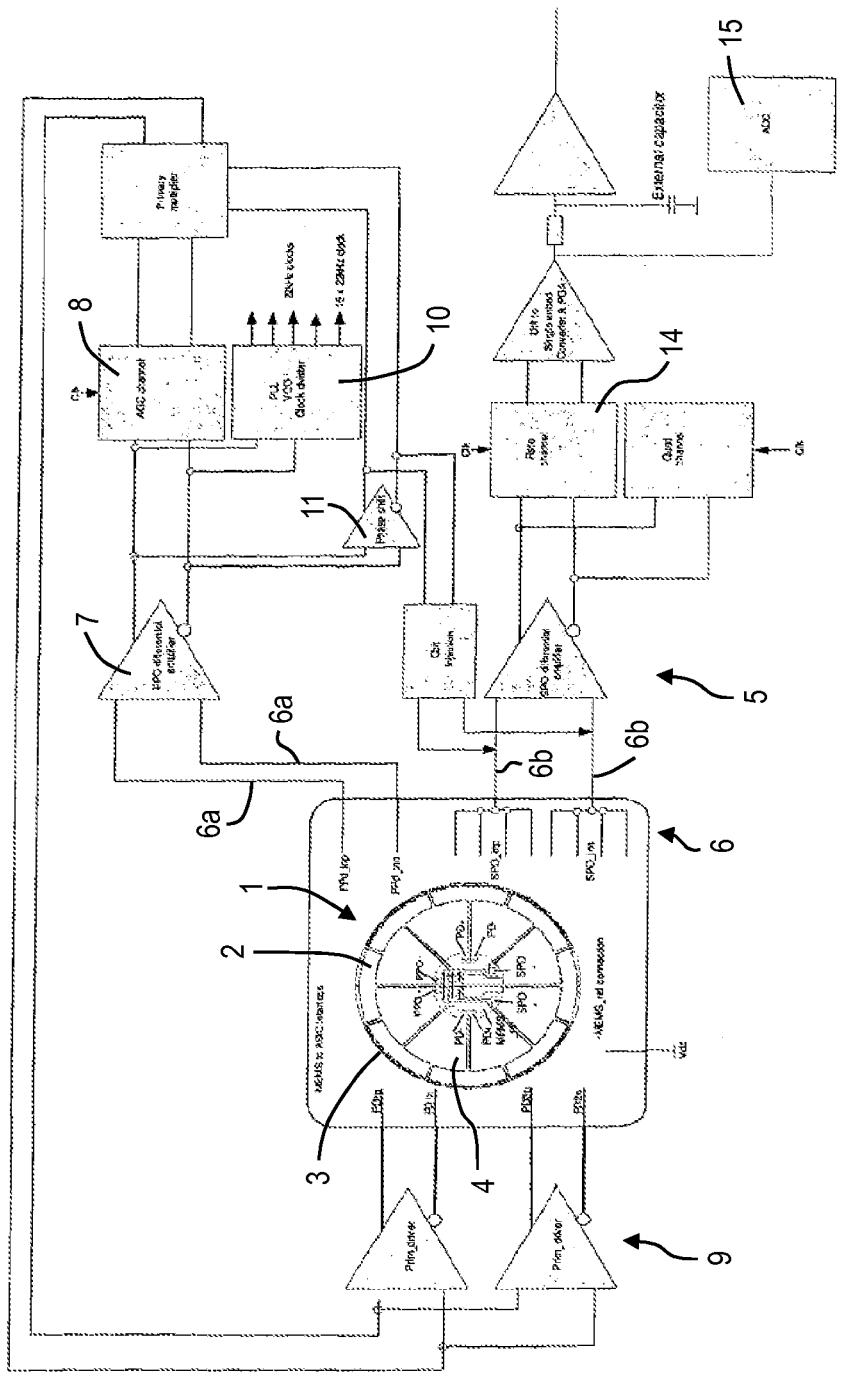
Figure 1 – Typical rate sensor architecture

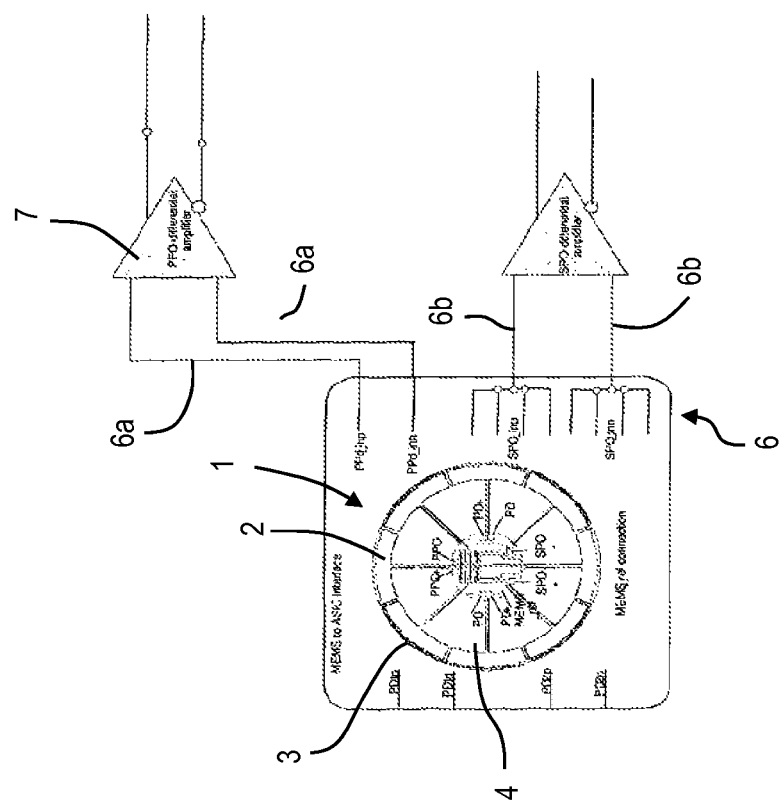
Figure 2 – transducer matching elements

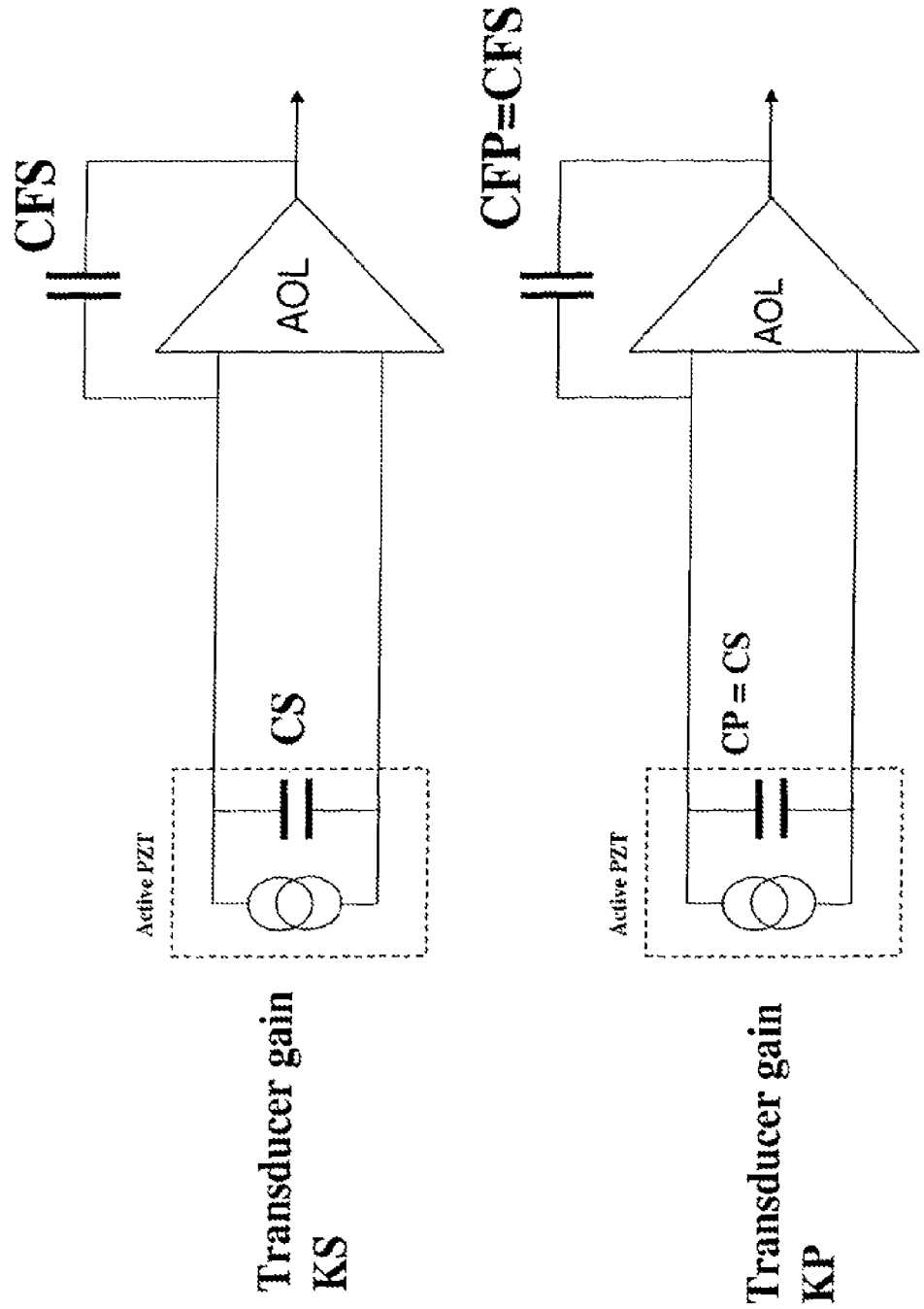

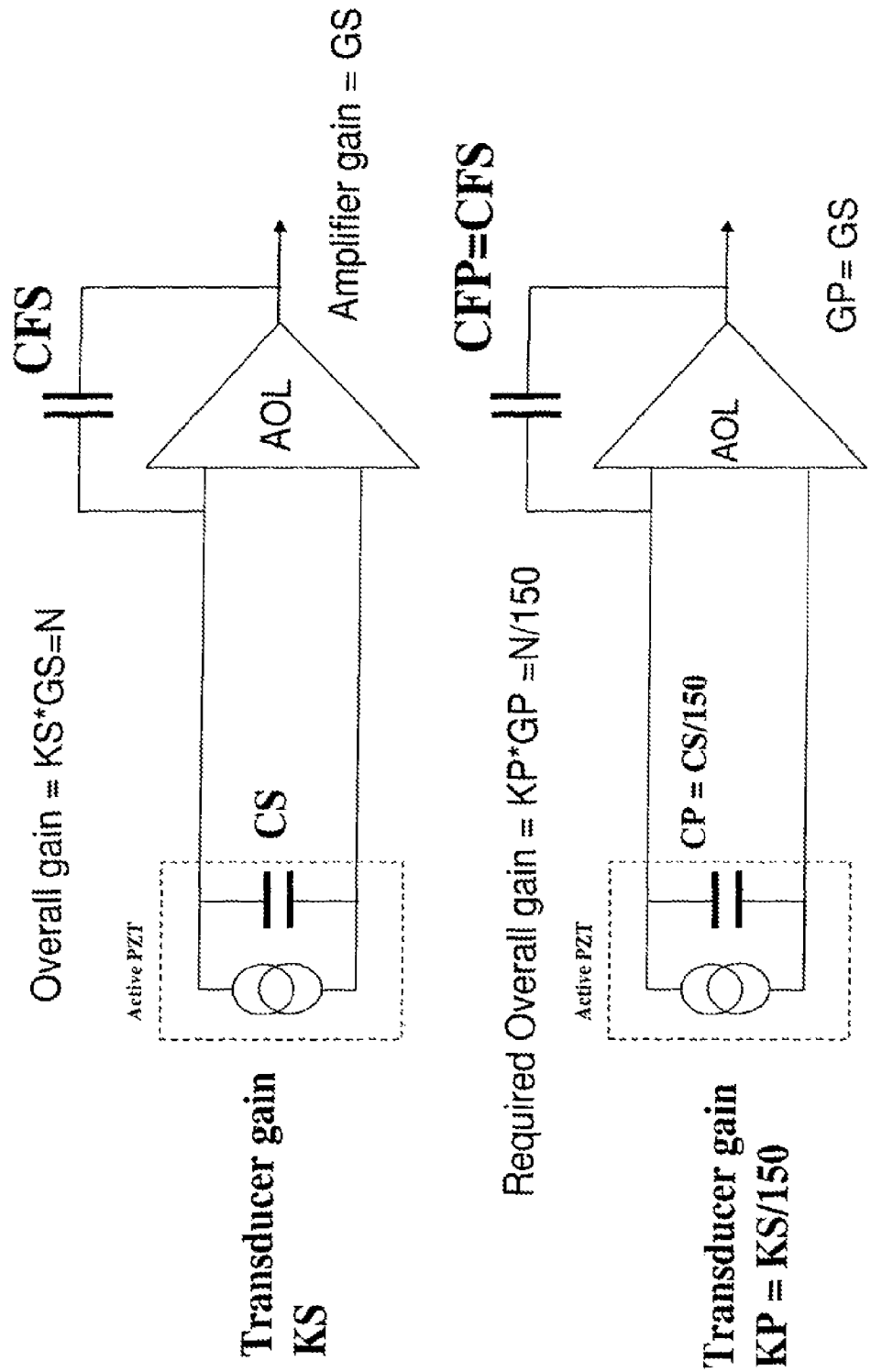
Fig 3b - Typical mismatched transducers gains (Ks = 150*Kp)

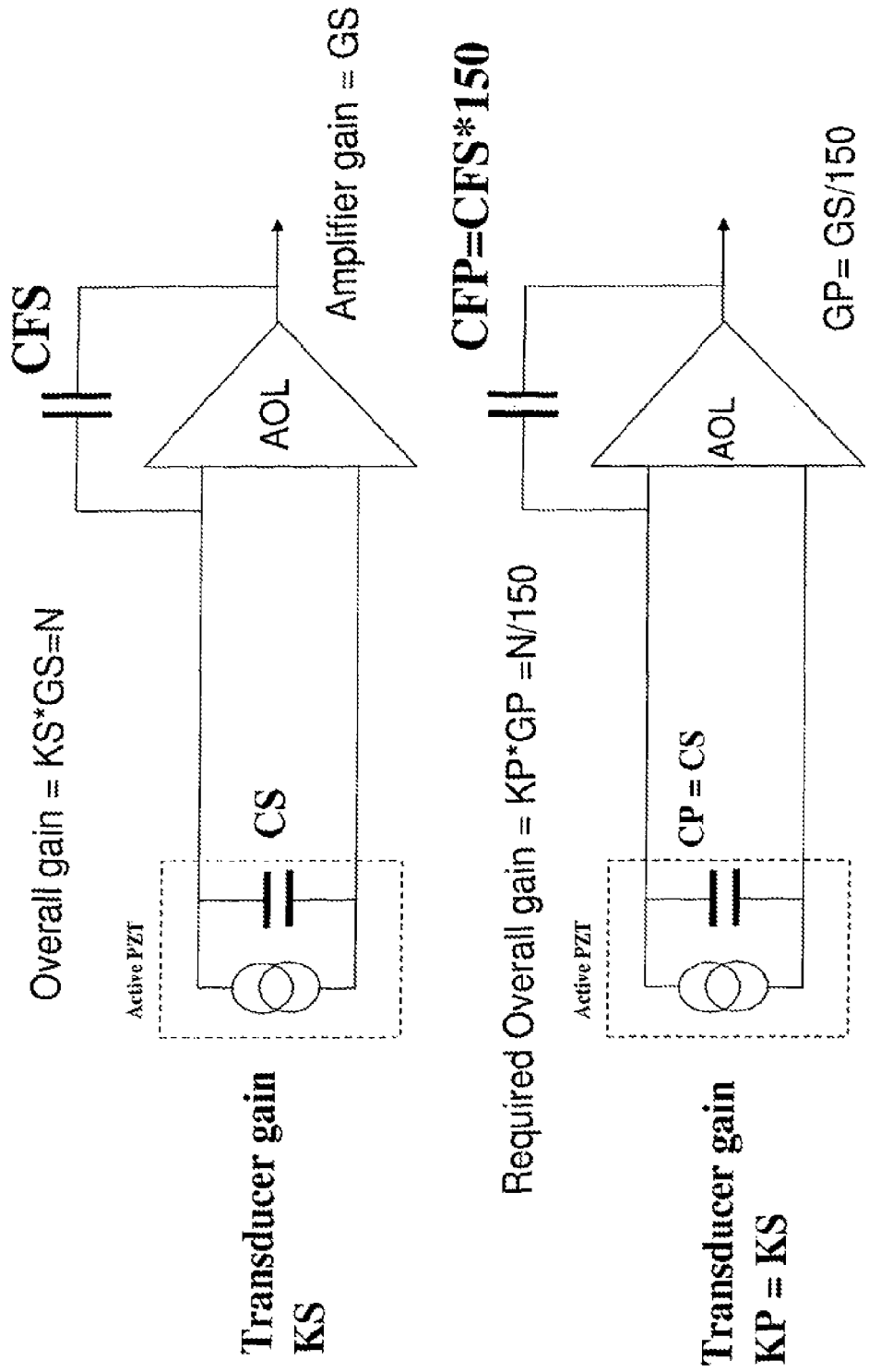

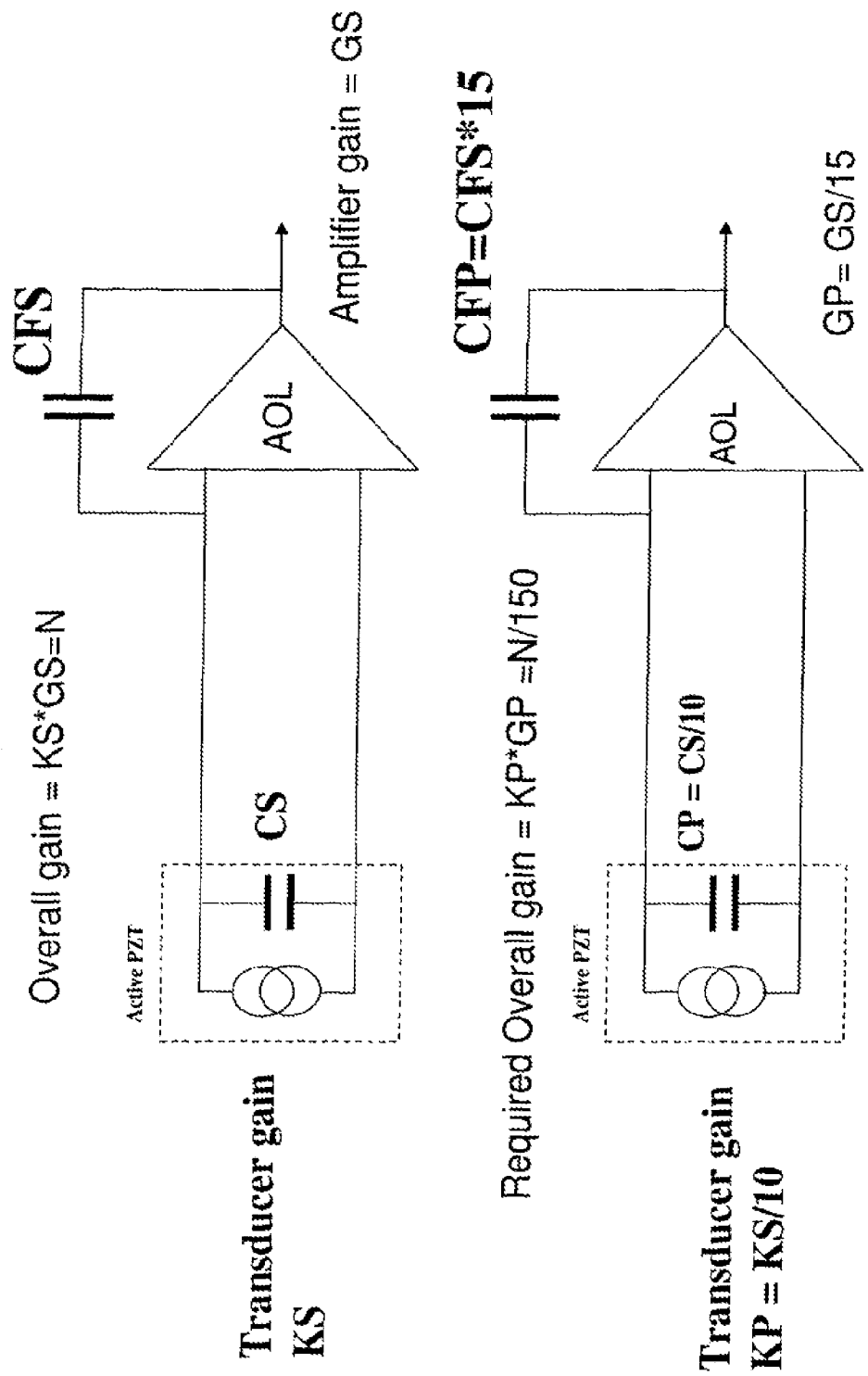

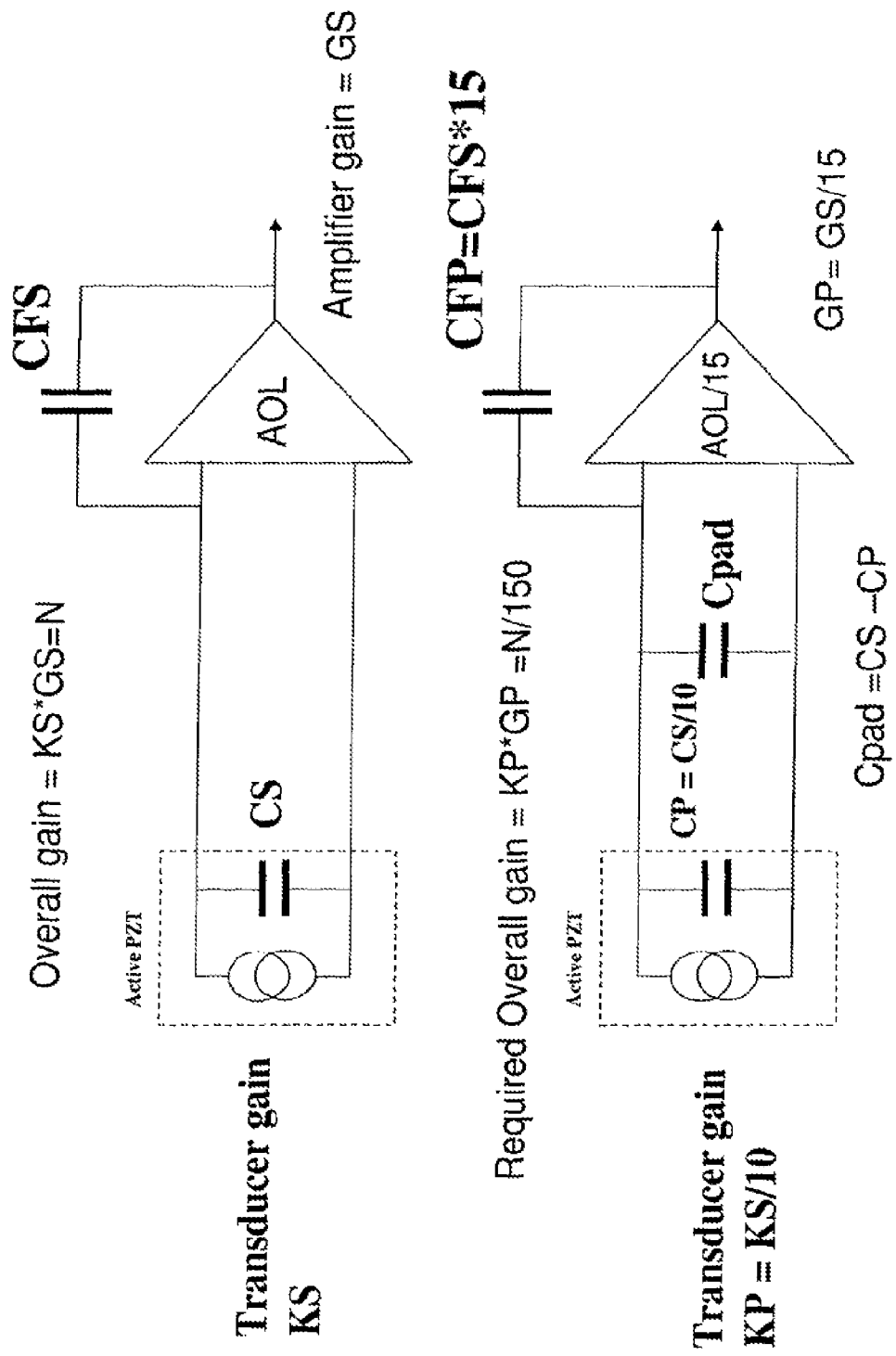

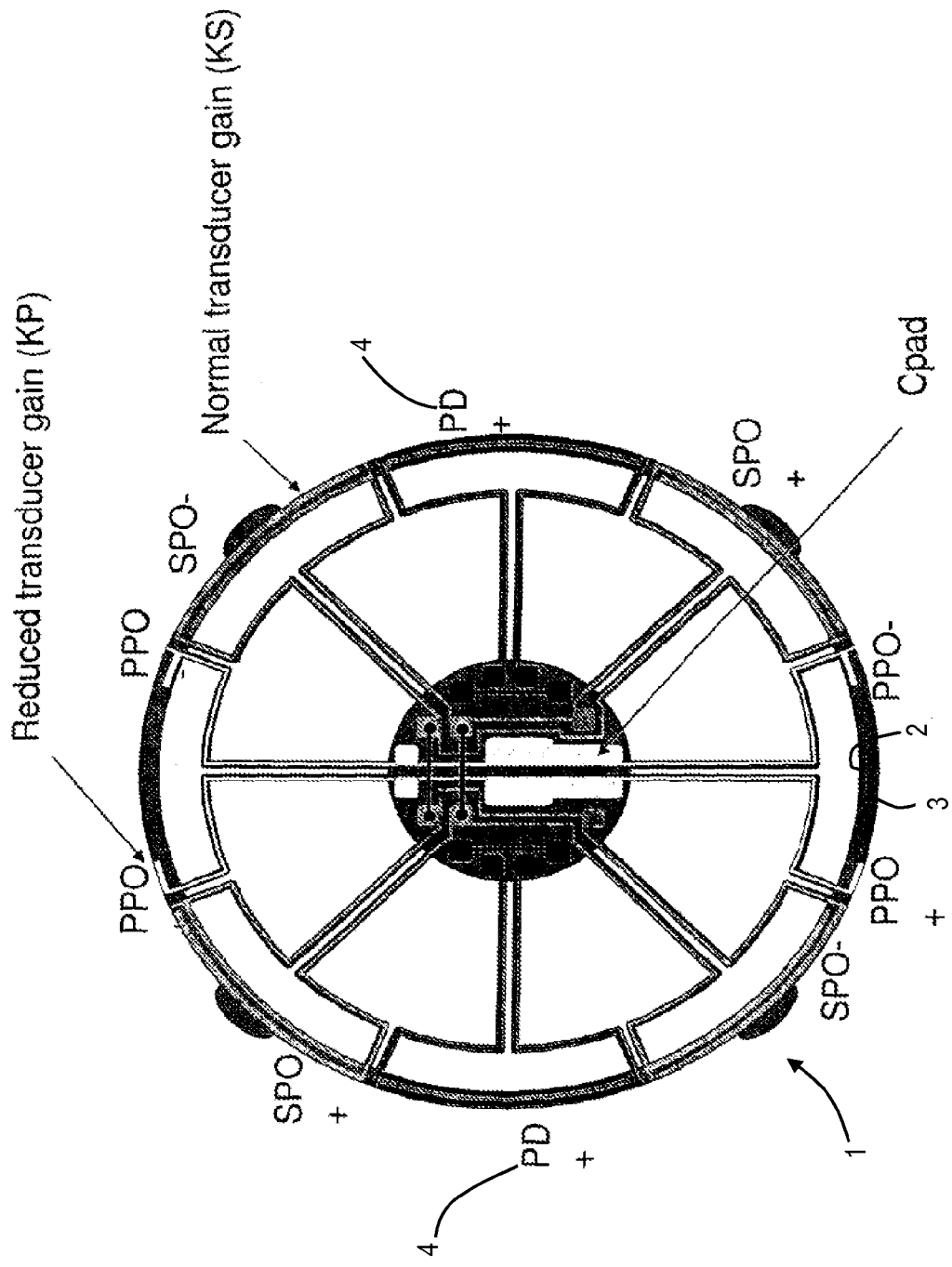

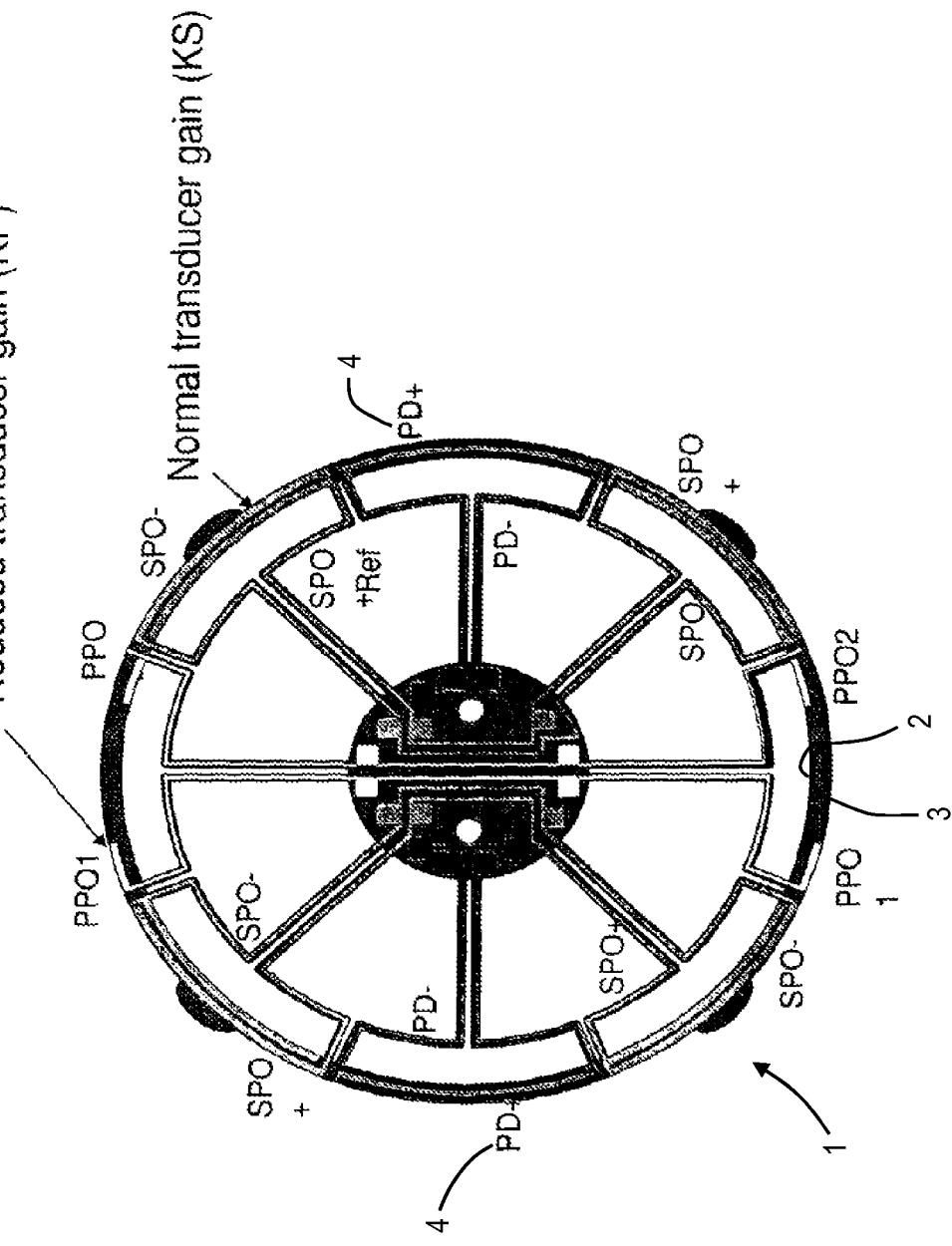
Fig 4b - Standard MEMS with different transducer gains

ANGULAR RATE SENSOR WITH IMPROVED AGING PROPERTIES

CROSS REFERENCE TO RELATED APPLICATION

The present application is the U.S. national stage application of International Application PCT/GB2011/000758, filed May 19, 2011, which international application was published on Nov. 24, 2011, as International Publication WO 2011/144899. The International Application claims priority of British Patent Application 1008526.4, filed May 21, 2010, the contents of which are incorporated herein by reference in their entireties.

TECHNICAL FIELD

The invention relates to sensors. More specifically but not exclusively it relates to sensors such as inertial sensors, for example coriolis gyroscopes, where a linear velocity component is first established and the rate dependant coriolis force is a function of this velocity.

BACKGROUND

Many types of inertial sensors are known. Angular velocity sensors incorporating a MEMS type ring are known and such examples can be seen in, for example, GB2322196. In such angular velocity sensors a vibrating planar ring or hoop-like structure is disclosed. The ring-like structure is suspended in space by a suitable support mount for detecting turning rate, linear acceleration and angular acceleration. Turning rate is sensed by detecting vibrations coupled by Coriolis forces, whereas linear acceleration and angular acceleration are sensed by lateral, vertical and rocking movement of the entire ring or hoop-like structure within its mount.

These sensors are required to accurately measure signals derived from stimuli which are also controlled by the sensor. In the case of coriolis gyroscopes, the linear velocity is setup and controlled by a transducers and the rate response is also measured by a 'similar' transducer.

Typically the MEMS ring type structures are formed from crystalline silicon and incorporate transducers formed from Lead Zirconate Titanate (PZT) materials. PZT materials have significant benefits in terms of signal level (and therefore signal to noise ratio levels) when used as the transducer technology in low cost MEMS sensor applications. However PZT suffers from fundamental ageing and temperature drifts compared to other transducers technologies (inductive, capacitive). Gain variations due to temperature effects may cause the rate sensor scalefactor to vary and this error can be compensated by using an independent temperature sensor but ageing is normally a limiting factor. In addition the phase accuracy of the transducers is a key error in determining the bias (Zero offset) of the overall rate sensor due to the presence of very large quadrature bias signals which are at 90 degrees (electrical) phase to the required rate signal and typically 3 orders of magnitude larger. The phase is affected by the PZT material characteristics, particularly capacitance and is also subject to large temperature and ageing related drifts. The result of all these issues is that the use of PZT transducers in MEMS sensors is limited and PZT is generally only used in low performance applications or where stability over a short timescale is required, for example in GPS aided navigation systems.

SUMMARY

According to the invention there is provided an angular velocity sensor having improved hysteresis and ageing properties the sensor comprising primary and secondary sensor elements, the sensor further comprising primary and secondary channels connected to said primary and secondary elements, the primary channel comprising primary driver means for initiating and maintaining resonant oscillations in the primary elements, the secondary channel comprising detector means for detecting signals generated by the secondary elements in response to movement of the sensor, the detecting means generating an output signal dependent upon the movement of the sensor, wherein the primary and secondary elements of the sensor are intentionally formed from different volumes of material such the deterioration of the sensor material does not affect the gain of the primary and secondary channels.

According to a further aspect of the invention, there is provided a method of overcoming hysteresis and ageing in sensor transducer materials comprising the step of increasing the volume of material in a primary transducer within a sensor relative to the volume of material in a secondary transducer within the sensor.

The invention will now be described with reference to the accompanying diagrammatic drawings in which:

BRIEF DESCRIPTION OF THE DRAWINGS

FIG. 1 is a schematic drawing of an angular sensor showing a sensor and control electronics in which the transducer and control electronics may be modified in order to compensate for ageing hysteresis;

FIG. 2 is a schematic diagram showing in more detail a part of the sensor of FIG. 1 that may be modified to incorporate one form of the invention;

FIG. 3a is a schematic diagram of the transducer and amplifier matching elements of FIG. 2 in accordance with one form of the invention in which the transducers are perfectly and ideally matched;

FIG. 3b is a schematic diagram of the transducers and amplifiers of FIG. 1 in accordance with another form of the invention in which the transducers are mismatched; namely the gain of the primary transducer is $1/150^{th}$ of the gain of the secondary transducer;

FIG. 3c is a schematic diagram of the transducers and amplifiers of FIG. 1 in accordance with another form of the invention in which the amplifiers are mismatched; namely the gain of the primary amplifier is $1/150^{th}$ of the gain of the secondary amplifier;

FIG. 3d is a schematic diagram of the transducers and amplifiers of FIG. 1 in accordance with another form of the invention in which the transducers and the amplifiers are mismatched, namely the gain of the primary transducer is $1/10^{th}$ of the gain of the secondary transducer and the gain of the primary amplifier is $1/15^{th}$ of the gain of the secondary amplifier;

FIG. 3e is a schematic diagram of the transducers and amplifiers of FIG. 1 in accordance with another form of the invention in which the transducers and amplifiers are mismatched, namely the gain of the primary transducer is $1/10^{th}$ of the gain of the secondary transducer and the gain of the primary amplifier is $1/15^{th}$ of the gain of the secondary amplifier and the capacitance of the system is changed by padding of the transducer material; and FIGS. 4a and 4b are schematic diagrams of the transducers elements described above showing the padding of the transducer elements in specific locations.

As shown in FIG. 1, the MEMS ring structure 1 of the angular velocity sensor comprises inner 2 and outer 3 peripheries extending around a common axis and therefore the drive and pickoffs operate differentially. It will be appreciated that the invention is not dependent on the individual drive and pickoff transducers being differential just that the primary pickoff and secondary pickoff are the same. Piezoelectric primary drive means 4 are provided that cause the sensor to vibrate on supports (not shown). The supports may include a plurality of flexible support beams (not shown) for supporting the sensor and for allowing it to vibrate in response to the piezoelectric primary drive means input in a substantially undamped oscillation mode. This enables the resonator to move relative to the support means in response to turning rate of the system including the sensor.

A detecting circuit 5 is provided to which a series of signals 6 are input from the sensor. The signals output by the sensor include primary pickoff signals 6a and secondary pickoff signals 6b and the transducer plates are arranged such that the signals are of a differential form. These signals are output from primary and secondary portions of the sensor.

The primary pickoff differential transducer signal is input to the primary channel including a differential charge amplifier (primary pickoff amplifier) 7 which provides a high level of gain to provide a low noise differential sinusoidal output signal at the carrier frequency. This signal is then passed through a synchronous detector 8 and suitable filtering to provide a control signal to the primary driver circuit 1 to set the level of the drive applied to the MEMS to ensure the primary pickoff amplifier output is on a controlled fixed level. The output of the primary pickoff amplifier 7 is also applied to the primary phase lock loop (PLL) and voltage controlled oscillator (VCO) 10 which locks to the pickoff signal to provide clocks for the synchronous detectors 8. The output of the primary pickoff amplifier 7 is also applied to the primary phase shift circuit 11 which amplifies the signal by a factor of two and shifts the phase of the differential signal by 90°. The output of the phase shift circuit 11 is applied to the primary driver circuit 1 which multiplies the differential sinusoidal output of the phase shift circuit 11 by the AGC control signal to generate the differential MEMS driver waveforms.

The secondary pickoff differential transducer signal is input to the secondary channel including a rate channel synchronous detector 14. The synchronous detector outputs an offset relative to the amplitude of the secondary response differential signal which is then filtered and converted into a single ended offset on the rate output signal and input to the ADC 15. The ADC outputs a signal representative of the movement of the sensor.

Any errors in the rate measurement channel (secondary pickoff 6b) can be cancelled by similar errors in the primary pickoff channel (6a and 7) in this system architecture. Therefore the effects of ageing and hysteresis can be removed. FIG. 2 shows the functions that must then be considered in optimising the implementations.

FIG. 3a shows an ideally matched condition where the secondary (rate sensing channel) and the primary (excitation channel) gains are identical. Any variations in the MEMS transducers or electronic components are very likely to match perfectly (especially in a highly integrate ASIC/MEMS implementation).

Unfortunately in any real application the gains are typically very different (150:1) between the secondary and primary channels, which makes matching very difficult. FIGS. 3b and 3c show 2 extreme case of achieving these gain differences by scaling the MEMS transducer gains (FIG. 3b) or scaling the electronics amplifier gains (FIG. 3c). Neither of these offer a practical solution as the high capacitance of the MEMS transducers means the electronics performance is influenced by the MEMS and visa versa.

FIG. 3d shows a more practical solution when the gain difference is shared between the MEMS transducer and the electronic amplifiers. The main error is still the transducer (piezo material) capacitance mismatch which is subject to ageing and temperature variations in a similar way to the transducer gain but it directly affects the performance of the electronic amplifier and so produces additional errors.

DETAILED DESCRIPTION

In use, the amplitude of motion on the primary element will be a lot larger than the secondary element, so the primary piezo transducer gain needs to be significantly smaller and this is achieved by making it physically smaller, but normally matching thickness and width.

The scale factor of the gyroscope, for an open loop sensor where there is secondary motion proportional to angular rate, depends on the ratio of the secondary pick off signal to the primary pick off signal. Thus to first order the scale factor is independent of similar gain variations of primary and secondary transducers. If, as is possible due to the nature of the materials used, the primary and secondary transducer age differently there will be a net change in the scale factor.

There is a certain gain difference in the electronics, with the secondary gain being higher than the primary gain. The gain of the front end electronics depends however on the source capacitance of the transducer. The effective electronics gain can therefore be matched between primary and secondary channels in the presence of a gain difference of the primary and secondary piezo transducers if the piezo capacitances are matched between primary and secondary.

As described in one form of the invention, this can be achieved by extra padding capacitance in the primary transducer which does not add any gain, just capacitance.

Thus the primary and secondary capacitances can be matched in the presence of a gain difference such that the electronics gain tracks between the two channels. Likewise the piezo transducers will track as the piezo ages as the ratio of the gain remains constant.

In this way the scale factor of the open loop vibrating gyroscope can be stabilised against ageing and hysteresis of the piezo material as will be described in more detail below.

In accordance with one form of the invention, as shown in FIG. 3e, the solution is to first minimise the primary gain (Kp) by making the transducer very small (typically KS/10) and then 'padding' the transducer capacitance with additional PZT material on areas not subject to mechanical stress. This will not result in the production of a signal (so KP<<KS) but will equalise the capacitance (CS=Cp) so the same source impedance is presented to the electronic amplifiers. The initial capacitance of the transducers will thus be matched and more importantly the ageing characteristics of the capacitance will also match. Accordingly, the effects on the electronics amplifiers will also be matched preventing the introduction of other errors. There will still be a requirement to optimise the amplifiers (which have different gains) to minimise the mismatching of the basic electronic performance and this can be done independently of the MEMS errors.

The signal processing electronics can then have different gains to make the overall gain KS=150*KP. The phase and gain accuracy of the electronics can then be matched by making the open loop gain ratios of the amplifiers matched to the closed loop gain ratios to make the sensitivity to capacitance changes or amplifier gain changes match for both transducers.

In this way, the ageing PZT ageing and temperature hysteresis effects in the MEMS rate gyroscope are overcome.

It will be appreciated that although the invention is described with reference to an angular velocity sensor using PZT piezoelectric transducers of the type described above, it may equally be applied to piezo materials other than PZT. Additionally, other forms of transduction such as capacitive or inductive, providing that the overall sensor requires a similar transducer to be used to set the basic operating point of the sensor Additionally, whilst the embodiment described above discloses a sensor having ring type sensor elements, it will be appreciated that it may be applied to any form of sensor where the elements may be padded as described above.

Furthermore, it will be appreciated that the transducers described do not have to be differential (as shown in FIG. 1) but may be of any suitable form.

Moreover, the embodiment described above details a gain of $1/150$ between primary and secondary channels and it will be appreciated that this is just one example of the differences required in a real system and not a theoretical model. The invention will apply to any system where the gain is not 1:1 and is especially important when the gain difference is large.

Yet further, any bulk material used for transduction, for example piezo resistive, would also benefit from the invention described above.

The invention claimed is:

1. An angular velocity sensor having improved hysteresis and ageing properties the sensor comprising primary and secondary sensor elements, the sensor further comprising primary and secondary channels connected to said primary and secondary elements, the primary channel comprising primary driver means for initiating and maintaining resonant oscillations in the primary elements, the secondary channel comprising detector means for detecting signals generated by the secondary elements in response to movement of the sensor, the detecting means generating an output signal dependent upon the movement of the sensor, wherein the primary and secondary elements of the sensor are formed from different volumes of material and wherein extra padding capacitance is disposed on the primary element in an amount such that a deterioration of a primary or secondary sensor element material does not affect a ratio of gains of the primary and secondary channels.

2. The angular velocity sensor according to claim 1 in which a capacitance of the primary sensor element is increased with respect to a capacitance of the primary sensor element by virtue of the extra padding material.

3. The angular velocity sensor according to claim 1 in which at least one of the primary and secondary elements are formed from a suitable piezoelectric material.

4. The angular velocity sensor according to claim 3 in which the piezoelectric material is Lead Zirconate Titanate (PZT).

5. The angular velocity sensor according to claim 2 in which a change in transducer material volume compensates for a mismatch in primary and secondary elements.

6. The angular velocity sensor according to claim 1 in which the sensor is of a ring type.

7. A method of overcoming hysteresis and ageing in sensor transducer materials comprising the step of increasing a volume of material in a primary transducer within a sensor relative to a volume of material in a secondary transducer within the sensor such that a deterioration of the sensor transducer materials does not affect a ratio of gains of primary and secondary channels corresponding to the primary and secondary transducers.

* * * * *